United States Patent
Kutschenreuter

(10) Patent No.: US 8,254,266 B2
(45) Date of Patent: Aug. 28, 2012

(54) METHOD FOR DETERMINING A PATH DISTANCE VALUE AND NETWORK NODES

(75) Inventor: Matthias Kutschenreuter, München (DE)

(73) Assignee: Siemens Aktiengesellschaft, Munich (DE)

( * ) Notice: Subject to any disclaimer, the term of this patent is extended or adjusted under 35 U.S.C. 154(b) by 334 days.

(21) Appl. No.: 12/595,541

(22) PCT Filed: Apr. 3, 2008

(86) PCT No.: PCT/EP2008/054037
§ 371 (c)(1),
(2), (4) Date: Oct. 12, 2009

(87) PCT Pub. No.: WO2008/125516
PCT Pub. Date: Oct. 23, 2008

(65) Prior Publication Data
US 2010/0067398 A1 Mar. 18, 2010

(30) Foreign Application Priority Data
Apr. 13, 2007 (DE) .......................... 10 2007 017 515

(51) Int. Cl.
*H04J 1/16* (2006.01)
(52) U.S. Cl. ......... 370/238; 370/252; 370/351; 370/400
(58) Field of Classification Search ................... 370/228, 370/229, 230, 231, 232, 235, 236, 238, 248, 370/252, 255, 316, 328, 329, 332, 349, 351, 370/395.32, 400, 409, 445, 466; 455/517, 455/522; 709/203, 238, 227, 22
See application file for complete search history.

(56) References Cited

U.S. PATENT DOCUMENTS

2002/0186665 A1* 12/2002 Chaffee et al. ................ 370/255
2005/0185632 A1   8/2005 Draves et al.
2005/0281199 A1  12/2005 Schaeferle
(Continued)

FOREIGN PATENT DOCUMENTS
DE    102006014911 A1  10/2007
EP       1617608 A1    1/2006

OTHER PUBLICATIONS

De Couto et al., A high-throughput Path Metric for Mutli-Hop Wireless Routing Proceedings of the 9th Annual International Conference on Mobile Computing and Networking, MOBICOM 2003, San Diego, CA, Sep. 14-19, 2003, Annual International Conference on Mobile Computing and Networking, New York, NY, ACM, US, Bd. Conf. 9, 14,09, 2003, pp. 134-146.

(Continued)

*Primary Examiner* — Michael Thier
*Assistant Examiner* — Abdullah Riyami
(74) *Attorney, Agent, or Firm* — King & Spalding L.L.P.

(57) ABSTRACT

In a method for determining link and route metrics, in order to determine an optimal path for time-critical transmission such as video telephony or VoIP, for use in routing protocols, the route metric is calculated as the product of the link metrics, wherein the link metrics in turn are calculated from the formula $L=1-(1-A1*A2)^{(W+1)}$, wherein L is the link metric, A1 and A2 are the data packet arrival rates in the outgoing and incoming directions of a link, and W is the maximum number of retransmissions per link. The route metric is optimal for the route which has the lowest number of lost packets.

12 Claims, 1 Drawing Sheet

U.S. PATENT DOCUMENTS

| | | | |
|---|---|---|---|
| 2005/0286426 A1* | 12/2005 | Padhye et al. | 370/238 |
| 2007/0070959 A1* | 3/2007 | Almeroth et al. | 370/338 |
| 2007/0195702 A1* | 8/2007 | Yuen et al. | 370/238 |
| 2008/0069034 A1* | 3/2008 | Buddhikot et al. | 370/328 |
| 2008/0107069 A1* | 5/2008 | Wu et al. | 370/329 |
| 2009/0232014 A1* | 9/2009 | Kutschenreuter et al. | 370/252 |
| 2010/0074194 A1* | 3/2010 | Liu et al. | 370/329 |
| 2010/0172249 A1* | 7/2010 | Liu | 370/252 |

OTHER PUBLICATIONS

Olga Saukh et al: "Generic Routing Metric and Policies for WSNs" Wireless Sensor Networks Lecture Notes in Computer Science; LNCS, Springer-Verlag, BE, vol. 3868, Jan. 1, 2006, pp. 99-114: Others.

International Search Report, PCT/EP2008/054037, 12 pages, Jul. 22, 2008.

* cited by examiner

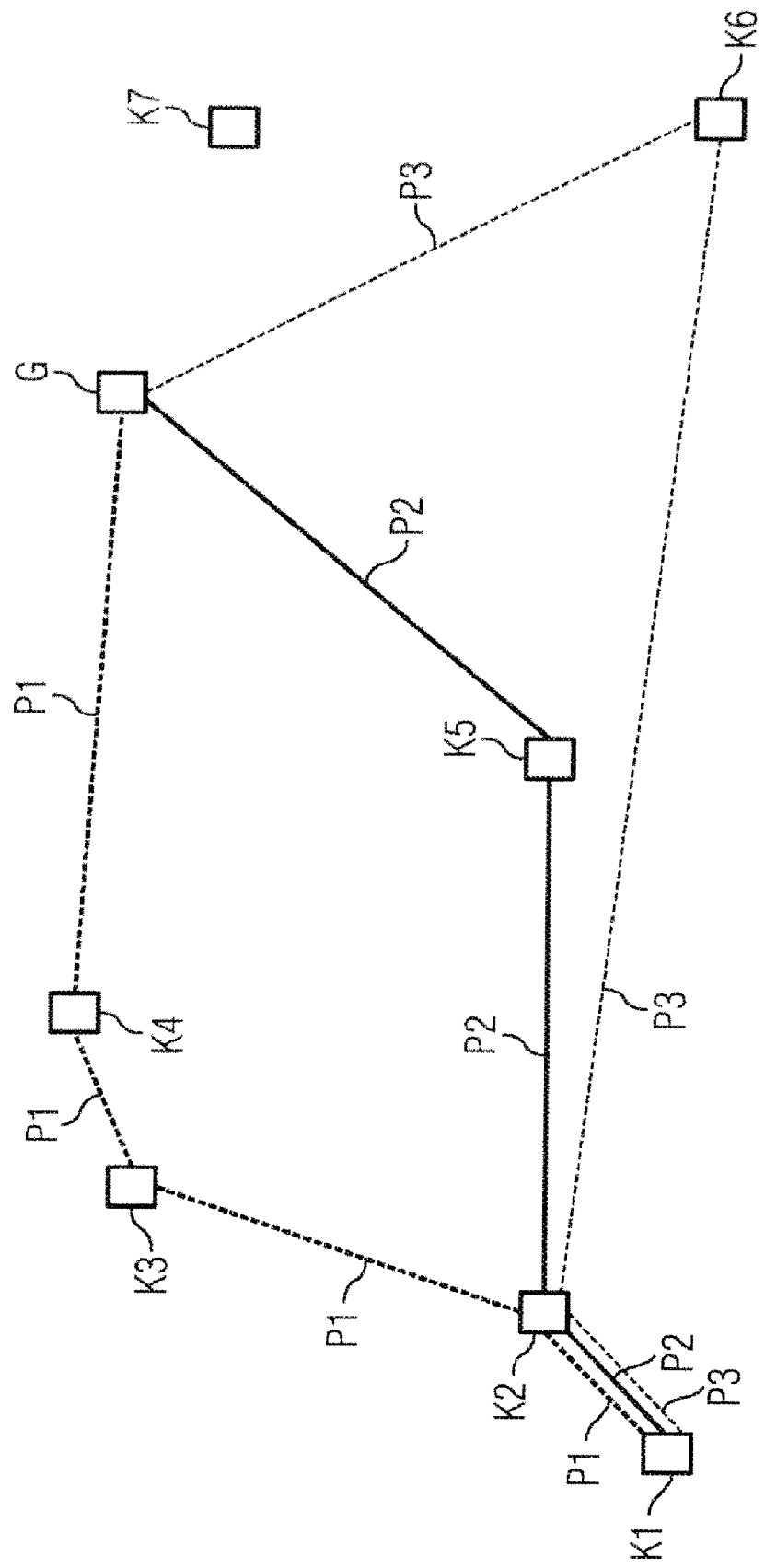

METHOD FOR DETERMINING A PATH DISTANCE VALUE AND NETWORK NODES

CROSS-REFERENCE TO RELATED APPLICATIONS

This application is a U.S. National Stage Application of International Application No. PCT/EP2008/054037 filed Apr. 3, 2008, which designates the United States of America, and claims priority to German Application No. 10 2007 017 515.0 filed Apr. 13, 2007, the contents of which are hereby incorporated by reference in their entirety.

TECHNICAL FIELD

The invention relates to a method for determining a path distance value and a network node.

BACKGROUND

A network enables the transmission of messages between its nodes. In a network, not all nodes of the network are directly connected to all other nodes. A message from a sending node to a receiving node must therefore often be forwarded via one or several intermediate nodes in order to arrive at a receiving node from a sending node. The path from the sending node via the intermediate node to the receiving node is referred to here as a path or route.

A routing method is used to select a suitable path for a message from a large number of theoretically possible paths in the network. The routing method firstly determines at least one, expediently however a plurality of path candidates, along which the message could be transmitted. A path distance value, a so-called route metric, is subsequently assigned to the path candidate in each instance. The path distance value is a measure of the quality of a path candidate. The path distance value is in turn usually determined from link distance values, which are in turn a measure of the quality of the links in the respective path candidate. The direct individual connection of the two nodes in the network is referred to here as a link.

Usage costs for a link in the path or the number of links in a path can enter into the path distance value for instance. It is also possible to enter the values for a transmission quality along the path candidate or a link in the path candidate or values for the transmission speed of the path candidate or a link in the path candidate. The path candidate with the optimal path distance value is selected below as a path. The message can now be transmitted along this path.

The methods for determining the path distance value are referred to as routing metrics. A known routing metric is an ETX (Expected Transmission Count). With the routing metric ETX, the path with which the number of transmissions to be expected is the lowest is selected. Transmissions are understood here to mean both transmissions as well as retransmissions. A first transmission is the transmission of a packet via a link. A retransmission takes place if the first transmission was not successful. The first transmissions and the retransmissions are treated equally in the case of ETX.

Retransmissions are nevertheless disadvantageous in that they may require more time than first transmissions. ETX is therefore disadvantageous in that it does not determine the optimal path for certain types of data transmissions in certain scenarios. Such data transmissions may be Voice over IP (VoIP) or video telephony for instance. Other examples of such types of data transmissions are all types of data transmissions, in which packet repetitions have negative effects on the quality of data transmission, and are therefore sensitive to repetitions.

SUMMARY

According to various embodiments, a method for determining a path distance value as well as a network node can be specified, which allows and/or can implement an improved path selection for repetition-sensitive data transmissions.

According to an embodiment, a method for determining a path distance value for a path in a network, comprises the step of determining the path distance value based on a first probability that a data packet is successfully transmitted along the path during transmission, wherein a) a maximum number of transmission repetitions entering into the first probability for a data packet in the case of an individual connection between two network nodes of the network, and b) at least one data packet arrival rate entering into the first probability for one or several individual connections of the path.

According to a further embodiment, the method comprises the steps of:—determining a link distance value entering into the first probability in each instance for at least one individual connection of the path; and—determining the path distance value from the link distance value. According to a further embodiment, the link distance value can be determined based on a second probability that a data packet is successfully transmitted via the individual connection during a transmission. According to a further embodiment, a first data packet arrival rate for a first transmission direction of the individual connection may be entering into the second probability. According to a further embodiment, in addition or alternatively, a second data packet arrival rate for the second transmission direction of the individual connection which may be opposite to the first transmission direction entering into the second probability. According to a further embodiment, the link distance value can be determined from the first and second data packet arrival rate on the basis of a first product. According to a further embodiment, the link distance value can be determined by means of the following formula: $L = 1 - (1 - A1 * A2)^{(W+1)}$; with: L link distance value; A1 first data packet arrival rate; A2 second data packet arrival rate; and W maximum number of transmission repetitions. According to a further embodiment, at least two link distance values can be determined and the path distance value being the product from the link distance values.

According to another embodiment, a network node may comprise a processing facility for determining a path distance value, which is embodied so as to implement a determination of a path distance value assigned thereto for a path, with the path distance value being determined based on a first probability that a data packet is successfully transmitted along the path during a transmission, with a) a maximum number of transmission repetitions entering into the first probability for a data packet in the case of an individual connection between two network nodes of the network and b) at least one data packet arrival rate entering into the first probability for one or several individual connections of the path.

According to yet another embodiment, a network may comprise at least one network node as described above.

BRIEF DESCRIPTION OF THE DRAWINGS

Further details and advantages of the invention are explained in more detail on the basis of exemplary embodiments illustrated in the drawing, in which;

FIG. 1 shows a schematic network with three path candidates.

DETAILED DESCRIPTION

With the method according to various embodiments for determining a path distance value for a path, the path distance value is determined based on a first probability. The first probability specifies the probability that a data packet is successfully transmitted along the path during a transmission. This means that the first probability specifies the probability that no repeated transmission is needed with any link.

a) A maximum number of transmission repetitions enter into the first probability for a data packet in the case of an individual connection between two network nodes of the network and b) at least one data packet arrival rate enters into the first probability for one or several individual connections of the path.

The metric determined with the method is advantageous in that it enables an improved path selection for time-critical data transmissions.

It is expedient if the following steps are implemented with the method:

determining a link distance value entering into the first probability for at least one link of the path in each instance;

determining the path distance value from the link distance value.

It is expedient here for a link distance value to be determined for at least two links of the path, preferably for each link of the path, in each instance. It is also expedient to determine the path distance value from at least two of the link distance values thus determined, particularly preferably from all link distance values thus determined.

In a further embodiment and development, the link distance value is determined based on a second probability that a data packet is successfully transmitted upon transmission via the link.

The link distance value is preferably determined for a first transmission direction of the link on the basis of a first data packet arrival rate, which enters into the second probability. In a particularly preferred embodiment, the link distance value is in addition or alternatively determined for a second transmission direction of the link which opposes the first transmission direction on the basis of a second data packet arrival rate, which enters into the second probability. Here the first and second data packet arrival rate essentially specify a probability with which a message sent via the link in the respective transmission direction is received by its destination.

The link distance value is preferably determined from the first and second data packet arrival rate on the basis of a first product. At least two link distance values are also preferably determined and the path distance value is determined from the link distance values on the basis of a second product.

The link distance value is advantageously determined by means of the following formula:

$$L = 1 - (1 - A1 * A2)^{(W+1)}$$

with "high" being meant by A and:
L link distance value
A1 first data packet arrival rate
A2 second data packet arrival rate
W maximum number of transmission repetitions.

The network node has a processing facility for determining a path distance value, which is embodied such that it determines a path distance value assigned thereto for one path, with the path distance value being determined based on a first probability that a data packet is successfully transmitted along the path during a transmission, with a) a maximum number of transmission repetitions entering into the first probability for a data packet during an individual connection between two network nodes of the network and b) at least one data packet arrival rate entering into the first probability for one or several individual connections of the path.

The network has at least one such network node.

The method can be used for instance in a routing method, such as AODV for instance.

The use of an embodiment of the routing metrics is to be shown below in a routing method. The ad-hoc network shown in FIG. 1 forms the basis here. This ad-hoc network contains a first to seventh node K1 ... 7 and a gateway G.

In this example, the first node K1 would like to send a message to the gateway G. It is assumed for this example that none of the nodes K1 ... 7 identifies a path to the gateway G and such a path does not therefore have to be completely determined.

The routing protocol AODV (Ad-hoc On-demand Distance Vector) is used to determine the path. AODV provides that the first node K1 sends a so-called route request message, in short RREQ, per broadcast to further nodes in its environment. These in turn forward the route request message. A route is determined if the RREQ reaches the destination. This route is sent by a so-called route reply message per Unicast back to the origin of the route request message, i.e. to the first node K1. To this end, each node K1 ... 7, which has received and forwarded the request, has stored the nodes K1 ... 7, from which it has received the route-request message.

Three path candidates P1 ... 3 are produced in this way in this example, along which the message can be transmitted from the first node K1 to the gateway G. The first path candidate P1 leads here from the first node K1 via the second, third and fourth nodes K2, 3, 4 to the gateway G. The second path candidate P2 leads from the first node K1 via the second and fifth nodes K2, 5 to the gateway G. The third path candidate P3 leads from the first node K1 via the second and seventh nodes K2, 6 to the gateway G. The seventh node K7 does not appear in any of the path candidates P1 ... 3 in this example.

To transmit the path candidates P1 ... 3 to the first node K1, route reply messages are now sent along the path candidates back to the first nodes K1. The gateway G therefore sends a route-reply message for the first path candidate P1 to the fourth node K4. This sends a route reply message to the third node K3, which in turn sends a route reply message to the second node K2, which sends a route reply message to the first node K1.

When receiving a route reply message, the receiving node K1 ... 7 determines a route metric for the respective path candidate P1 ... 3 in each instance. This relates here to the part of the path candidate P1 ... 3 from the destination, i.e. in this example the gateway G to the respective receiving nodes K1 ... 7. The route metric is then forwarded in the route reply message so that the first node K1 can finally determine the overall route metric for each of the path candidates P1 ... 3.

As a routing metrics, i.e. as a specification for determining the quality of a path candidate P1 ... 3, a route metric is used here, in which a data arrival rate is used as the link metrics. The link metrics is determined in this exemplary embodiment on the basis of the following formula:

$$LM = 1 - \left(\frac{bp * nbp * m}{mttmtt}\right)^{rtm+1}$$

where
LM link metrics
bp time period for metric messages
mtt metric time interval
rtm maximum number of retransmissions
m,n number of received metric messages in the last metric time interval for one of the nodes of the link in each instance The link metrics LM is calculated from the afore-cited formula for a link comprising two nodes K1 ... 7 of the network in each instance. The nodes K1 ... 7 here transmit metric messages such as hello messages for instance with the temporal distance bp, for instance 1 second. For each of the two nodes K1 ... 7 of a link, account is taken of how many (m, n) of the metrics messages it has received in the last metrics time interval mtt, for instance 30 seconds, from other nodes K1 ... 7 in each instance. The value rtm specifies how many retransmissions, i.e. renewed packet transmissions, are allowed. rtm=4 is assumed here as an example, other values such as 7 for instance are also possible.

If in the case of the given exemplary values for the time intervals the third node K3 and fourth node K4 has received 10 and 20 metrics messages within the last 30 seconds respectively, i.e. each third and/or each second metrics message, the following results for the links metrics:

$$LM = 1 - \left(1 - \frac{1s \cdot 15}{30s} \cdot \frac{1s \cdot 10}{30s}\right)^{4+1} = 1 - \left(1 - \frac{1}{6}\right)^5 \approx 0.6$$

It is also conceivable to determine the data packet arrival rate differently to metrics messages.

The route metric results from the product of the link metrics of a respective path candidate P1 ... 3:

$$R = \prod_{Links} LM$$

R—route metric
LM—link metrics
Links—all of the links of a path candidate P1 ... 3
Here the term $$\frac{bp \cdot n}{mtt} \frac{bp \cdot m}{mtt}$$

can be considered as the probability that a transmission with a possible renewed transmission, i.e. retransmissions, is successful via a given link. The term $$R = \prod_{Links} LM$$

in turn specifies the probability that a transmission with possible renewed transmissions, i.e. retransmissions, is successful via an overall path candidate.

The criterion $$1 - \frac{bp \cdot n}{mtt} \frac{bp \cdot m}{mtt}$$

is used advantageously as a metrics component, since it is clear herefrom whether a VoIP transmission actually makes sense. The route metric according to various embodiments can also be used to implement a so-called admission control. A VoIP connection is completely prevented here, if all existing path candidates P1 ... 3 are not able to have an adequate route metric, since in this case, a VoIP connection with adequate quality is not easily possible.

During the further course of the afore-cited example, each node K1 ... 7, which receives a route reply message, compares the route metric of the respective path candidate P1 ... 3 with a threshold value. The threshold value is to amount here to 0.95. If the route metric of the respective path candidate P1 ... 3, which is determined with a node K1 ... 7, exceeds the threshold value, the respective path candidate P1 ... 3 is rejected. This means that the node K1 ... 7 does not send any more route reply message in respect of the respective path candidates P1 ... 3. The rejected path candidate P1 ... 3 does not reach the first node K1 and can thus also not be used to transmit the message to the gateway G. The first node K1 itself also compares the route metric of a path candidate P1 ... 3 transmitted thereto per route reply message with the threshold value and rejects the path candidate P1 ... 3 if its route metric reaches or fails to reach the threshold value.

The first node K1 firstly selects the path candidate with the best, i.e. highest route metric, from the path candidate P1 ... 3 which was not rejected.

The course described below results from the specified diagram for the individual path candidates P1 ... 3. Exemplary values are assumed here for the link metrics, which are combined in the following table:

| Link between: | Link metrics: |
| --- | --- |
| Gateway G, fourth node K4 | 0.98 |
| Gateway G, fifth node K5 | 1.00 |
| Gateway G, sixth node K6 | 0.99 |
| Fourth node K4, third node K3 | 0.99 |
| Third node K3, second node K2 | 1.00 |
| Second node K2, first node K1 | 0.97 |
| Fifth node K5, second node K2 | 0.98 |
| Sixth node K6, second node K2 | 0.89 |

In the case of the first path candidate P1, a route reply message is sent from the gateway G to the fourth node K4. This calculates the route metric for the previous first path to the link metrics for this link, in other words 0.98. The path candidate P1 is thereupon not rejected since its route metric is greater than 0.95. A route reply message subsequently moves from the fourth node K4 to the third node K3. This calculates the route metric from the product of the previous route metric and the link metrics for the link between itself and the fourth node K4, in other words 0.98*0.99=0.97. After a route reply message to the second node K2, this calculates the route metric in an unchanged fashion to be 0.97*1=0.97. The first node K1 calculates the route metric to be 0.97*0.97=0.94 after the last route reply message. The first path candidate P1 is therefore rejected in the case of the first node K1, since its route metric is smaller there than 0.95.

With the same procedure, a route metric of 1.00 and/or 0.98 and/or 0.95 results with the second path candidate P2 in the case of the fifth, second and first node K5, 2, 1. In the case of the third path candidate P3, route metric of 0.99 and 0.88 result in the case of the sixth node K6 and/or in the case of the second node K2. The third path candidate P3 is therefore already rejected in the case of the second node K2, since its route metric is already smaller there than the threshold value of 0.95. The third path candidate P3 therefore does not reach the first node K1.

In this example, the first node will therefore select the second path candidate P2, which is the only one to have a suitable route metric, in order to transmit the message to the gateway G.

One alternative embodiment of the routing method results such that the link metrics are already transmitted with the route request messages. This embodiment of the routing method already enables the gateway G to make a decision on the path.

What is claimed is:

1. A method for determining a path distance value for a path in a network having multiple network nodes, the path including multiple individual connections in series, each individual connection connecting two of the network nodes, the method comprising:

for each of at least two individual connections in the path, determining a link distance value based on a link transmission probability that a data packet is successfully transmitted via the individual connection during a transmission, wherein the link transmission probability is determined based at least on (a) a data packet arrival rate for transmissions via the individual connection and (b) a maximum number of transmission repetitions via the individual connection; and determining the path distance value representing a first probability that a data packet is successfully transmitted along the path during transmission, wherein the path distance value is calculated based on the at least two calculated link distance values.

2. The method according to claim 1, wherein a first data packet arrival rate for a first transmission direction of the individual connection entering into the link transmission probability.

3. The method according to claim 2, wherein, in addition or alternatively, a second data packet arrival rate for the second transmission direction of the individual connection which is opposite to the first transmission direction entering into the link transmission probability.

4. The method according to claim 3, wherein the link distance value being determined from the first and second data packet arrival rate on the basis of a first product.

5. The method according to claim 4, wherein the link distance value being determined by means of the following formula:

$$L=1-(1-A1*A2)^{(W+1)}$$

with:
L link distance value
A1 first data packet arrival rate
A2 second data packet arrival rate
W maximum number of transmission repetitions.

6. The method according to claim 1, wherein the path distance value is the mathematical product of the at least two link distance values.

7. A network node comprising a processing facility for determining a path distance value for a path in a network having multiple network nodes, the path including multiple individual connections in series, each individual connection connecting two of the network nodes, the processing facility for determining a path distance value comprising a processing unit programmed to:

receive at least two link distance values, each link distance value corresponding with one of the individual connections of the path and calculated based on a link transmission probability that a data packet is successfully transmitted via that individual connection during a transmission, the link transmission probability being determined based at least on (a) a data packet arrival rate for transmissions via the individual connection and (b) a maximum number of transmission repetitions via the individual connection; and calculate the path distance value representing a first probability that a data packet is successfully transmitted along the path during a transmission, wherein the path distance value is calculated based on the at least two calculated link distance values, such that the path distance value is determined based on (a) the data packet arrival rates for transmissions via the at least two individual connections and (b) the maximum number of transmission repetitions via the at least two individual connections.

8. The network node according to claim 7, wherein a first data packet arrival rate for a first transmission direction of the individual connection entering into the link transmission probability.

9. The network node according to claim 8, wherein, in addition or alternatively, a second data packet arrival rate for the second transmission direction of the individual connection which is opposite to the first transmission direction entering into the link transmission probability.

10. The network node according to claim 9, wherein the link distance value being determined from the first and second data packet arrival rate on the basis of a first product.

11. The network node according to claim 10, wherein the link distance value being determined by means of the following formula:

$$L=1-(1-A1*A2)^{(W+1)}$$

with:
L link distance value
A1 first data packet arrival rate
A2 second data packet arrival rate
W maximum number of transmission repetitions.

12. The network node according to claim 7, wherein the path distance value is the mathematical product of the at least two link distance values.

* * * * *